(12) United States Patent
Lemery et al.

(10) Patent No.: US 10,060,812 B2
(45) Date of Patent: Aug. 28, 2018

(54) MINIATURE PRESSURE SENSOR HAVING A METALLIC MEMBRANE FOR MEASURING A PRESSURE OF A FLUID

(71) Applicant: L'ESSOR FRANÇAIS ELECTRONIQUE, Ivry-la-Bataille (FR)

(72) Inventors: Fabien Lemery, Rouen (FR); Stéphane Jourdan, Saint Sebastien de Morsent (FR); David Cayez, Versailles (FR)

(73) Assignee: L'ESSOR FRANÇAIS ELECTRONIQUE, Ivry-la-Bataille (FR)

( * ) Notice: Subject to any disclaimer, the term of this patent is extended or adjusted under 35 U.S.C. 154(b) by 102 days.

(21) Appl. No.: 15/046,244

(22) Filed: Feb. 17, 2016

(65) Prior Publication Data

US 2016/0238477 A1     Aug. 18, 2016

(30) Foreign Application Priority Data

Feb. 18, 2015   (FR) .................................... 15 51368

(51) Int. Cl.
| | |
|---|---|
| G01L 7/08 | (2006.01) |
| G01L 9/00 | (2006.01) |
| G01L 9/04 | (2006.01) |
| G01L 19/00 | (2006.01) |
| G01L 19/14 | (2006.01) |
| G01L 19/06 | (2006.01) |

(52) U.S. Cl.
CPC .......... *G01L 9/0042* (2013.01); *G01L 9/0051* (2013.01); *G01L 19/0061* (2013.01); *G01L 19/0084* (2013.01); *G01L 19/0681* (2013.01); *G01L 19/143* (2013.01)

(58) Field of Classification Search
None
See application file for complete search history.

(56) References Cited

U.S. PATENT DOCUMENTS

| | | | |
|---|---|---|---|
| 3,568,124 A | 3/1971 | Sonderegger | |
| 6,387,318 B1 * | 5/2002 | Xue | .................... C03C 10/0045 |
| | | | 264/642 |

(Continued)

FOREIGN PATENT DOCUMENTS

GB         2 064 778 A      6/1981

*Primary Examiner* — Daniel S Larkin
*Assistant Examiner* — Jermaine Jenkins
(74) *Attorney, Agent, or Firm* — Baker & Hostetler LLP

(57) ABSTRACT

A pressure sensor to measure the pressure of a fluid comprises: a metallic membrane to be in contact with the fluid and on which are stacked an electrical insulator and at least one gauge for measuring the deformation of the membrane, the whole forming a sensitive measuring element a cap comprising: a cover comprising a cavity and holes; conductors located in the holes, the sensitive element exhibiting a face opposite the cap and located in a plane P; wherein the sensor comprises: at least one metallic zone, located in a plane parallel to said plane P, for hermetic sealing of the cap on the sensitive measuring element; continuous metallic tracks comprising parts for picking up contact with the conductors and parts for picking up contact with at least the gauge. A method for manufacturing the pressure sensor is also provided.

16 Claims, 14 Drawing Sheets

(56) References Cited

U.S. PATENT DOCUMENTS

| | | | | |
|---|---|---|---|---|
| 7,036,384 B2* | 5/2006 | Tanaka | ................ | G01L 9/0054 |
| | | | | 73/754 |
| 7,201,057 B2* | 4/2007 | Agami | ................ | G01L 19/04 |
| | | | | 361/283.1 |
| 7,302,856 B2* | 12/2007 | Tang | ................ | G01L 1/18 |
| | | | | 73/777 |
| 7,434,476 B2* | 10/2008 | Tang | ................ | B82Y 35/00 |
| | | | | 73/777 |
| 7,495,302 B2* | 2/2009 | Fischer | ................ | B81B 7/0029 |
| | | | | 257/419 |
| 7,594,442 B2* | 9/2009 | Kaiserman | ................ | B60N 2/002 |
| | | | | 73/760 |
| 8,012,360 B1* | 9/2011 | Sippola | ................ | G01L 9/0042 |
| | | | | 216/13 |
| 8,393,223 B2* | 3/2013 | Delapierre | ................ | G01L 9/0055 |
| | | | | 361/283.4 |
| 9,562,814 B2* | 2/2017 | Kulkarni | ................ | G01L 1/2287 |
| 2013/0162270 A1 | 6/2013 | Kishida et al. | | |

* cited by examiner

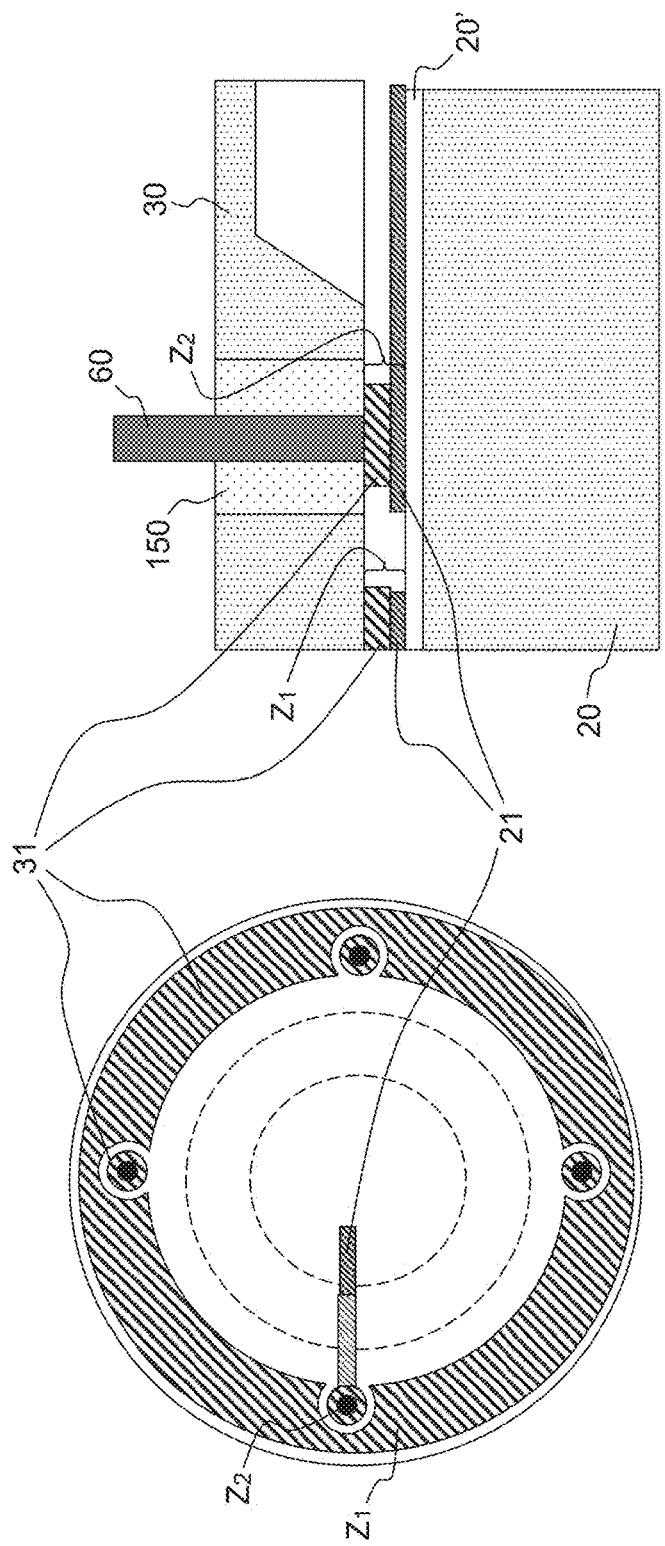

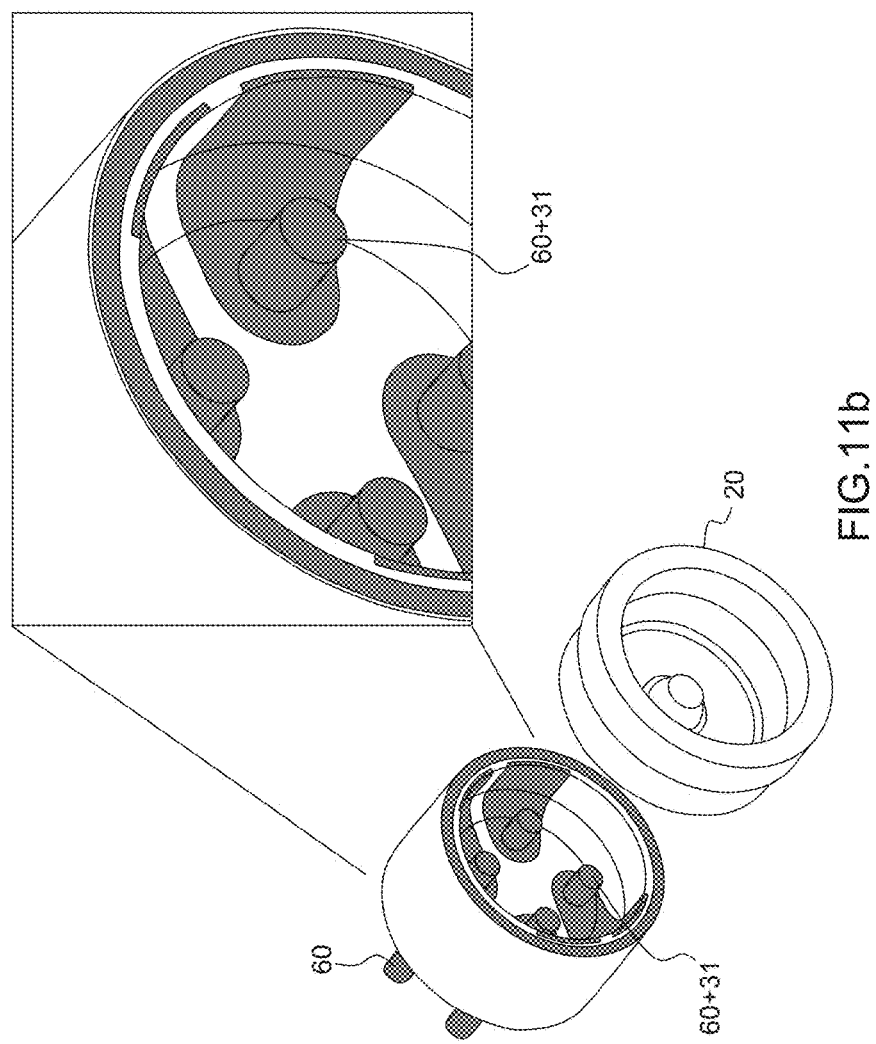

MINIATURE PRESSURE SENSOR HAVING A METALLIC MEMBRANE FOR MEASURING A PRESSURE OF A FLUID

CROSS-REFERENCE TO RELATED APPLICATIONS

This application claims priority to foreign French patent application No. FR 1551368, filed on Feb. 18, 2015, the disclosures of which are incorporated by reference in their entirety.

FIELD OF THE INVENTION

The field of the invention is that of "all-fluids" compatible pressure sensors and especially of miniaturized pressure sensors making it possible to measure the pressure of a fluid.

BACKGROUND

In general, the pressure of gases and liquids is an important parameter to be controlled in numerous fields of application such as transport, energy, defense, health or computer-integrated manufacturing. This accounts for why numerous technologies of pressure sensors have been developed and why research work is ever important to improve the performance thereof.

So-called mass markets (automotive, electro-domestic, altimetry . . . ) above all demand price reductions. So-called professional markets (aeronautical, computer-integrated manufacturing, oil prospecting, research . . . ) demand ever more accuracy and resistance to severe environments, in particular to chemical attack by all fluids. All the fields request more miniaturization.

Ideally a pressure sensor must make it possible to obtain at one and the same time:
excellent accuracy;
good resistance to chemical attack of the environment;
good resistance to temperature;
excellent stability;
wide bandwidth;
minimum bulkiness;
low cost price.

Measurement Principle

In most cases, a pressure sensor incorporates a membrane which deforms under the action of a pressure that may typically be exerted by a fluid, this deformation being measured by virtue of resistive strain gauges deposited on the membrane. The gauges change resistive value while following the deformation of the membrane. Four gauges are generally used, mounted as a Wheatstone bridge and positioned in such a way that, under the effect of the deformation, two gauges increase in value and two others decrease. The power supply and the output of the bridge are connected by virtue of contact pins and/or conducting wires. These wires are attached to the membrane by virtue of connection pads which form the bond with the strain gauges.

The sensor generally comprises a so-called upper part called a cap exhibiting openings through which contact pickups can pass. Moreover the sensor can also incorporate a lower part called the "connection" intended for connecting it to the client's application. Advantageously this connection is equipped with a threading (or tapping) and exhibits an opening opposite a part of said membrane on which a pressure can be exerted.

The pressure difference between the two faces of the membrane is thus measured. In the particular case where the reference pressure applied to one of the faces is vacuum, the sensor is said to be absolute. For the so-called gage sensor, one of the faces of the sensitive element is referenced to atmospheric pressure.

There exist three large families of technology for manufacturing sensors with variation of resistors: so-called silicon membrane based on silicon technologies, so-called metallic membrane based on thin film technologies and finally, so-called ceramic membrane based on thick film technologies.

The latter exhibits a definite benefit with a view to cost optimizations but significant limitations in terms of fluidic compatibility, miniaturization and also resistance to high pressures and temperatures.

The main benefit of silicon technologies is that they utilize microelectronics miniaturization and cost reduction resources. Today they address the crux of the mass markets. The piezoresistive gauges are either diffused in the membrane (ionic implantation of N or P impurities), or made of monocrystalline silicon on insulator (SOI) for high-temperature applications. They give a higher output signal than thin film gauges but their value also varies more with temperature. Their final metrological performance is overall comparable to thin film sensors in terms of accuracy.

Thin film technology is differentiated in particular from the previous two in that its substrate is metallic. It is therefore naturally compatible with the very great majority of fluids used in industry. Whatever this fluid, it is in direct contact with the measuring membrane, equipped with the strain gauges, without the intermediary of a separator membrane such as that with which silicon sensors are equipped in the presence of corrosive fluids. Thin film technology sensors moreover exhibit the characteristics of high resistance and accuracy over wide temperature range. The signal that they deliver is weaker than the silicon sensors but exhibits the advantage of great stability over time.

State of the Art of so-Called "all-Fluid" Sensors

A significant limitation for silicon sensors comes from the very poor resistance of silicon to corrosive fluids. The manufacturers of pressure sensors who use silicon technology in harsh environments, circumvent this problem by protecting the silicon membrane in a stainless metal body. FIG. 1 thus illustrates a sensor of the known art exhibiting a silicon membrane.

More precisely this sensor comprises:
a connection 1;
a silicon membrane 2;
a stainless metal housing 3 enclosing said membrane forming cap in part;
intermediate elements 4 made of a material that may be glass and with expansion coefficient close to silicon, which are sealed in the housing by a flexible material 5;
pins 6 allowing contact pickups for the gauges;
an incompressible fluid 7 which transmits the pressure P to the silicon membrane;
a thin and flexible diaphragm 8;
wiring elements 9.

Such a solution works, but however considerably reduces the expected miniaturization and cost reduction advantages of micro-technologies. Moreover, the flexible diaphragm and oil-filled design limit the accuracy, the frequency response and the temperature resistance of the sensor. Moreover, these intermediaries constitute weak points and may prohibit their use in specific applications, having regard to the risk of pollution of the process by the fluid 7 of the sensor or of instability and of inaccuracy if the sensor is subjected to fast thermal variations. Another difficulty for silicon sensors is related to the very large difference in expansion coefficient between silicon and metals. In many applications the sensor must be mounted on metallic walls by a thread connection. The silicon chip must therefore be fixed in a metallic housing, the difference in thermal expansion coefficient between the two materials then generating parasitic stresses and strains, sources of significant drift. This question forms the subject of a great deal of attention on the part of the manufacturers of silicon sensors who minimize the parasitic strain by interposing between the silicon sensor and the metal a sufficiently thick (1 to 2 mm) material (element 4 represented in FIG. 1), generally glass, with expansion coefficient close to silicon. This material is sealed in the housing by a flexible material 5 which thus absorbs part of the difference in expansion. The use of these intermediate materials can also lead to instability of the measurement over time.

The technologies of thin film sensor based on metallic membranes, stainless steel, titanium, hastelloy, inconel or copper-beryllium, are the oldest and exhibit the advantage of being directly usable with the majority of corrosive fluids. In their case, the measuring membrane equipped with the strain gauges is in direct contact with the fluids, without intermediary or protection, as is the case with the incompressible fluid and flexible diaphragm design for silicon sensors. Consequently, they are especially used for applications which require high resistance to chemical attack, good accuracy and reliability. Their general principle is recalled hereinafter and illustrated in FIG. 2.

The pressure membrane 2 is assembled with a thread connection 1. A stack of thin layers, one of which is an electrical insulator layer, the strain gauges 10 and connection pads 16 are deposited by (chemical or physical) vapor phase vacuum methods on this metallic membrane. The constituent materials of the gauges in particular can be made of thin layers of metallic alloys (deposition by cathodic sputtering of NiCr for example) or of semi-conductors (deposition of polycrystalline silicon for example).

The cap is produced with a metallic body 3 on which contact pins 6 are sealed by the glass-metal sealing technique, via glass sealing elements 15. The connecting of the gauges to the pins is performed by a wiring 9 produced by brazing of conducting wires. This assembly allows the creation of the reference pressure cavity 17: vacuum for absolute sensors or atmospheric pressure for gage pressure sensors.

A variant of the sensor with metallic membrane presented above is illustrated in FIG. 3. This variant makes it possible to circumvent a brazing (typically based on tin) performed directly on the sensitive element. A relay printed circuit 18 on which wiring can be produced by "ball bonding" 19 (welding of a wire or by ultrasound assisted thermo-compression) is used in this case. This system is preferable for the temporal stability of the layer but exhibits obvious drawbacks in terms of bulkiness.

The great benefit of these sensors is that they are metallic and, consequently, compatible with a majority of the aggressive fluids used in industry. However, a significant obstacle remains to be overcome for these technologies: very advanced miniaturization to obtain sensors of the order of 5 mm and even less in diameter.

State of the Art of Miniature Sensors

On the market, there exists mainly one type of pressure sensor with miniature metallic membrane 2, produced in accordance with a few variants. The metallic membrane is designed to be welded flush typically on a thread miniature metallic connection of type M5 or equivalent as illustrated in FIG. 4, which also depicts the gauge 10 and the insulator I located on said membrane 2.

The membrane is previously insulated and equipped with silicon bar gauges. For obvious space reasons, the Wheatstone bridge can be composed of two active gauges ("half bridge" setup), supplemented with offset fixed resistors.

This optimization of the setup makes it possible to address the miniaturization and fluidic compatibility requirements while offering a large dynamic range.

However, these models do not use thin film technology and therefore exhibit the drawbacks related to glued silicon bar gauges, very often crippling:

the pickup of connections is very complex and has an impact on reliability;

the sensor is sensitive to temperature variations and especially to thermal shocks;

the process for manufacturing the sensor is essentially manual;

the glue used to affix the silicon bar gauges to the metallic membrane induces creep over time and a limitation in temperature;

In the absolute sensor case, the vacuum cavity cannot be produced at the level of the silicon gauges, as close as possible to them, thereby limiting the miniaturization possibilities.

Silicon membrane technology also proposes a few miniaturization solutions. FIG. 5 describes a typical state of the art in this field. The silicon chip consists of a silicon membrane 2 with deformation measurement gauges 10 made of doped monocrystalline silicon. A glass cap 11 is hermetically sealed by electrostatic bonding ("anodic bonding") on the diffused silicon connection layer 12, thus protecting the gauges 10 from the exterior environment. Openings produced in this glass allow this assembly to be electrically linked to contact pins 6 by "glass frit" or "sintered glass" conductor 13 (mixture of gold and sintered glass). Such a solution enables extra miniaturization, however it still involves a stack of heterogeneous materials, with complex mounting operations. It does not on the other hand afford any progress as regards resistance to corrosive fluids.

It is in particular to achieve the dual-objective of miniaturization and "all-fluids" compatibility that the Applicant has designed a novel type of sensor with metallic membrane which, because of a compact architecture that can be miniaturized, makes it possible:

to ensure with few elements a pickup of exterior contacts of the measurement gauges;

to be assembled readily with any type of mechanical connection.

In variants of the invention, the sensor is proposed wireless, thereby adding to the pluses related to its thin film technology very great robustness to stresses and strains from vibrations, accelerations or shocks.

SUMMARY OF THE INVENTION

The solution of the present invention makes it possible to achieve high levels of miniaturization, while preserving the intrinsic advantages of thin film sensors, especially compatibility with most fluids and great reliability. The setup of this solution with the membrane flush with the fluid to be measured makes it possible to optimize the miniaturization while offering a response to the requirements of dynamic measurements.

More precisely, the subject of the present invention is a pressure sensor intended to measure the pressure of a fluid comprising:
- a metallic membrane intended to be in contact with said fluid and on which are stacked an electrical insulator and at least one gauge for measuring the deformation of said membrane, the whole forming a sensitive measuring element
- a cap comprising:
  - a cover comprising a cavity and holes;
  - conductors located in said holes,
- said sensitive element exhibiting a face opposite the cap and located in a plane P;

characterized in that said sensor comprises:
- at least one metallic zone, located in a plane parallel to said plane P, for hermetic sealing of said cap on said sensitive measuring element;
- continuous metallic tracks comprising parts for picking up contact with said conductors and parts for picking up contact with at least said gauge.

The conductors are elements able to transmit an electrical signal from one point to another. They can be pins or vias corresponding to holes filled with a material allowing electrical conduction.

According to the present invention, the sensitive element is thus protected by a cap comprising the conductors, said conductors being connected to at least said measurement gauge by electrical links formed by said metallic tracks, the cap being sealed to said sensitive element at the level of the metallic sealing zone.

If one wishes to miniaturize the sensor, the space available for carrying out the sealing of the cap on the membrane and the contact elements becomes very small. Indeed especially when the conductors are metallic pins, the inter-pin dimensions, pins themselves and drill holes considerably limit the possibilities of miniaturization. The offsetting of the pins becomes a particularly beneficial solution, since it makes it possible to profit from a larger surface of the cap, the sealing bead, more miniature, being able to remain in the restricted space initially provided. This is why, according to the invention, the parts for picking up contact with the conductors can be offset with respect to the parts for picking up contact with the measurement gauges, the parts for picking up contact with the conductors, still ensuring electrical linking, but exhibiting a break in transmission axis.

According to variants of the invention, the metallic zone for hermetic sealing of said cap on the sensitive element is located at the periphery and can correspond to a sealing bead.

According to variants of the invention, the cover is made of metal, the cover and said membrane being able to be produced from one and the same material. The cover can be made of stainless steel or of titanium or of copper beryllium or of inconel or of Hastelloy.

According to variants of the invention, the cover is a ceramic substrate. The cover can also comprise a stack of ceramic layers comprising on their surface metal patterns linked between layers by vias. The ceramic material cover exhibits a thermal expansion coefficient close to that of the metallic membrane and can typically be of the order of 10 ppm/° C.

According to variants of the invention, the pins are fixed hermetically to said cover with glass elements. The pins can also be fixed hermetically to said cover with at least one metallic layer.

According to variants of the invention, the parts for picking up contact with said conductors comprise metallic patterns produced in at least one metallic layer and covering the end of said pins at the bottom of the cavity.

According to variants of the invention, the cover comprises at least one opening making it possible to reference the sensitive element to atmospheric pressure or to reference the cavity subsequently to vacuum by means of additional obturation.

According to variants of the invention, the sensor comprises a connection. In general, the connection is the mechanical component making it possible at one and the same time to connect the pressure sensor with the user's connection and to ensure the leaktightness thereof. The user's connection is the mechanical component for a given application, complementary to the connection of the pressure sensor intended to be attached thereto. For this purpose, the sensor can comprise a membrane and a connection which are produced as a monolithic metallic component.

The subject of the invention is also a method for manufacturing a pressure sensor according to the invention, intended to measure the pressure of a fluid, characterized in that it comprises:
- the production of a sensitive element comprising a metallic membrane, an electrical insulator and at least one gauge for measuring the deformation of said membrane;
- the production on the surface of said sensitive element of a first metallic sealing zone and the production of metallic contact tracks of at least said gauge;
- the production on the surface of said cap of a second metallic sealing zone and the production of metallic tracks for picking up contact with the conductors;
- the assembling of said sensitive element and of said cap by brazing and/or welding in a plane parallel to that of the face of the sensitive element opposite the cap, so as to ensure pickup of contact and sealing.

The advantages of the method of the invention reside especially in:
- the necessity to use few components for complete assemblage;
- the simultaneity of the operations of pickup of electrical contact and of sealing.

The contact tracks of at least the gauge and the contact tracks of the conductors thus define the continuous metallic tracks of the sensor.

The subject of the invention is further a pressure sensor obtained by the method of the invention.

According to variants of the invention, the cover comprising a ceramic substrate, the conductors being pins, the sealing of said pins is carried out by brazing on the basis of a conducting substance.

According to variants of the invention, the method for manufacturing the sensor comprises the following steps for producing the cap:
- the production of metallic patterns on the surface of ceramic layers and the production of vias in said layers;
- the stacking of said layers comprising said patterns and said vias.

According to variants of the invention, the method comprises a sealing operation carried out in the presence of an exterior element as a material necessary for brazing or as a eutectic preform.

According to variants of the invention, the metallic sealing zones or the metallic tracks are produced by etching of a layer made of metal or of material capable of forming a eutectic with a metal or by silk-screen printing of a metal or of a material capable of forming a eutectic with a metal.

BRIEF DESCRIPTION OF THE DRAWINGS

The invention will be better understood and other advantages will become apparent on reading the nonlimiting description which follows and by virtue of the appended figures among which:

FIGS. 6a to 6f represent sectional views and perspective views of a first type of pressure sensor according to the invention comprising conductors opposite the contact pickups for the strain gauges;

FIGS. 11a to 11d represent exploded perspective views of the sensitive element part and of the cap of the second type of sensor according to the invention;

DETAILED DESCRIPTION OF THE INVENTION

Figure 1:
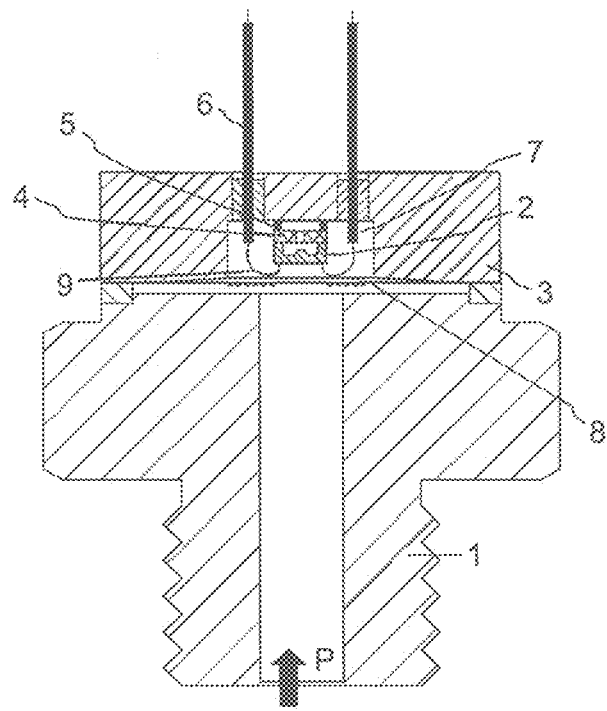
FIG. 1 illustrates a first exemplary so-called "all-fluid" pressure sensor according to the known art comprising a silicon membrane and a separator membrane.
Figure 2:
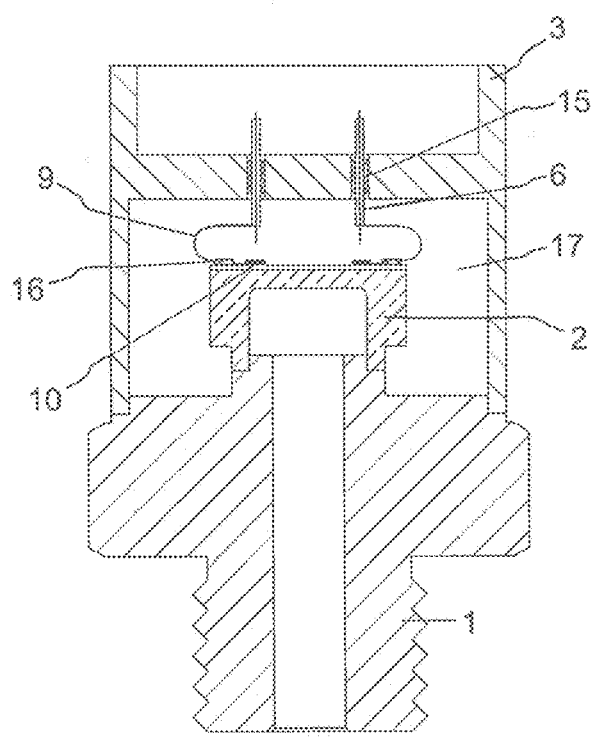
FIG. 2 illustrates a second exemplary so-called "all-fluid" pressure sensor according to the known art comprising a metallic membrane.
Figure 3:
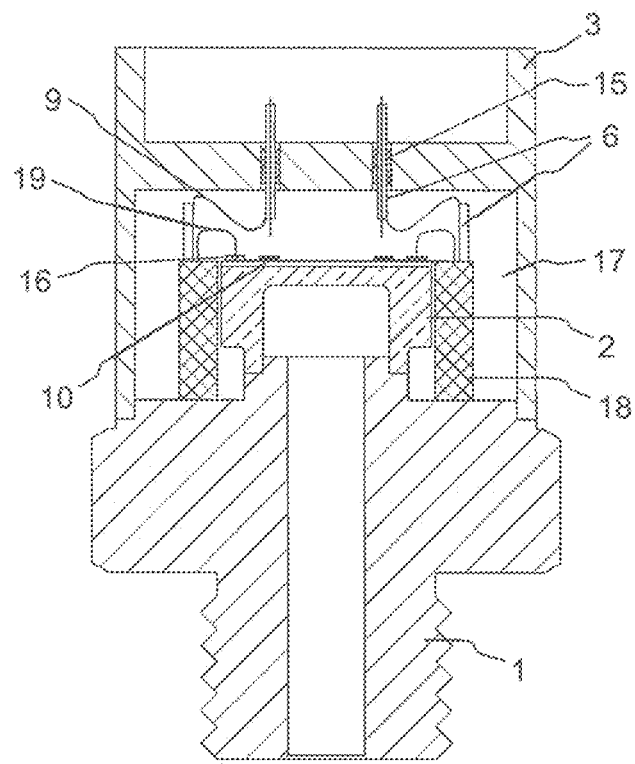
FIG. 3 illustrates a third exemplary so-called "all-fluid" pressure sensor according to the known art comprising a metallic membrane.
Figure 4:
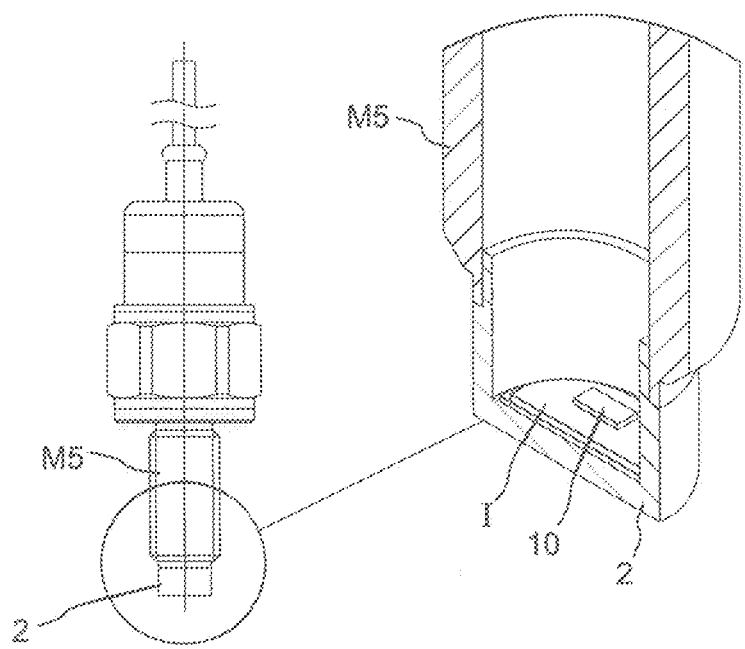
FIG. 4 illustrates a first exemplary miniature pressure sensor according to the known art comprising a metallic membrane.
Figure 5:
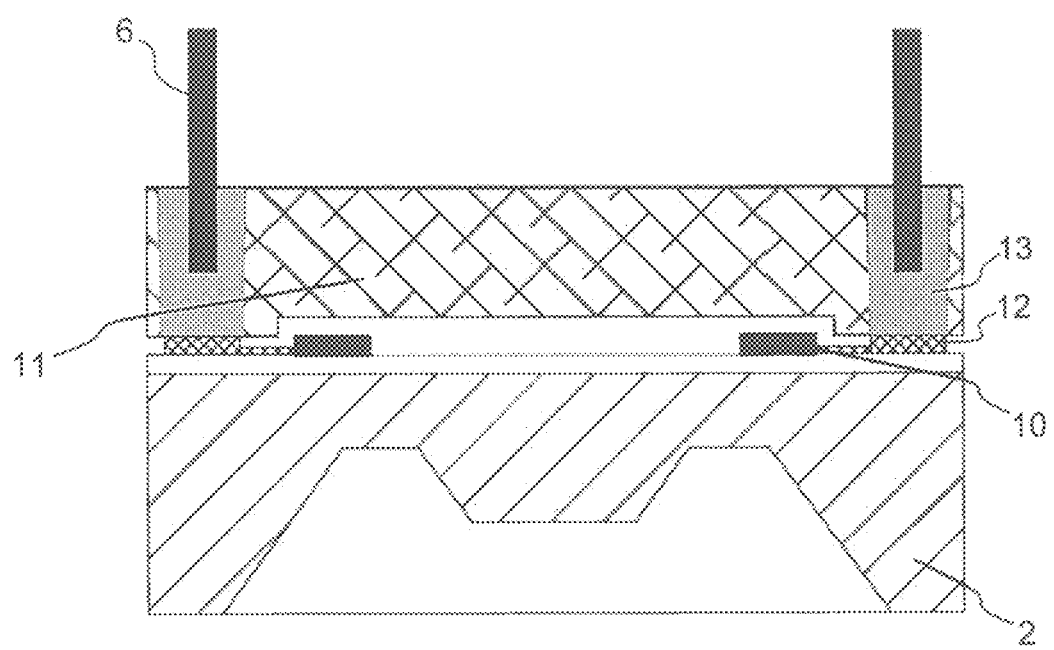
FIG. 5 illustrates a second exemplary miniature pressure sensor according to the known art comprising a silicon membrane.

In general, the pressure sensor of the present invention comprises a sensitive element with a membrane equipped with at least one measurement gauge for measuring the deformation of said membrane, under the action of a pressure of interest.

The sensor comprises at least one first metallic zone making it possible to ensure the hermetic fixing of a cap intended to ensure the protection of said membrane and the referencing to a reference pressure, the first metallic zone being located at the interface between the sensitive element and the cap.

The sensitive element comprises a part of the second metallic zones for pickup of contact with the deformation measurement gauge or gauges.

The cap consists of a cover comprising holes in which conductors are positioned. The conductors can typically be pins or vias. The cap also comprises a part of the second metallic zones for pickup of contact with the conductors.

Such a configuration makes it possible to devise sensors of small dimensions, requiring a restricted number of elements.

Advantageously, the sensor can comprise a ceramic cover (made of alumina for example) with expansion coefficient close to that of the metal of the membrane. The benefit of this solution is of having an insulating material which avoids the deposition of an insulating thin layer, a potential source of electrical defects.

When the conductors are metallic pins (Kovar typically) and the cover is produced in a ceramic substrate, the method for sealing the pins at the level of the cover can be a conventional brazing method based on the methods of Mo—Mn metallization, generally in the form of powders. The latter are deposited on the ceramic to be metallized and then the assembly is baked at high temperature. To improve the grip and the wettability of the brazing, an alloy in thin or thick layers is deposited thereafter. The most often used are alloys based on silver (AgCu, AgCuPd, . . . ), copper or alloys based on gold (Au). A metal that is often brazed on alumina is Kovar (Fe-28Ni-18Co alloy), which can therefore constitute an excellent material for the contact pins. Other alloys such as Mo—Mn (so-called "active" alloys) can also be used.

First Type of Pressure Sensor According to the Invention:

According to this first variant embodiment of pressure sensor, and illustrated in FIGS. 6a, 6b, 6c and 6d, the sensitive element comprises a membrane 20 equipped with measurement gauges on the surface of an insulating layer 20'. Conventionally, the sensor can be equipped with an assembly of four gauges mounted as a Wheatstone bridge and positioned in such a way that, under the effect of the deformation, two gauges increase in value and two others decrease. According to this example, the conductors are pins. Thus, the power supply and the output of the bridge can be connected outside the sensor (rendering the signals available/accessible to the outside) by virtue of contact pins 60 previously fixed hermetically by fixing elements 150 to a cover 30 and located in holes.

The pressure sensor comprises a first metallic zone $Z_1$, making it possible to ensure the hermetic fixing of said cap on said sensitive measuring element and second metallic contact pickup zones $Z_2$ for said pins and connected to the deformation measurement gauge or to said deformation measurement gauges. Conducting patterns are defined in a conducting layer 21, and in a conducting layer 31, as illustrated in the assembly of FIGS. 6a to 6d.

The stacking of these conducting patterns produced in the layers 21/31 makes it possible to define locally:

the first zone $Z_1$ resulting from the stacking of the zones $Z_{1-21}$ and $Z_{1-31}$ arising from the layers respectively 21 and 31 to ensure the fixing of the sensitive element and of the cap;

the second zones $Z_2$ resulting from the stacking of the zones $Z_{2-21}$ and $Z_{2-31}$ arising from the layers respectively 21 and 31 to ensure the pickup of contact of the gauges via the pins 60.

According to this variant of the invention, the pins are located opposite the second contact pickup zones $Z_{2-21}$ and therefore the parts for picking up contact with said conductors are opposite the parts for picking up contact with said strain gauges, as illustrated in FIG. 6b.

Figure 6C:
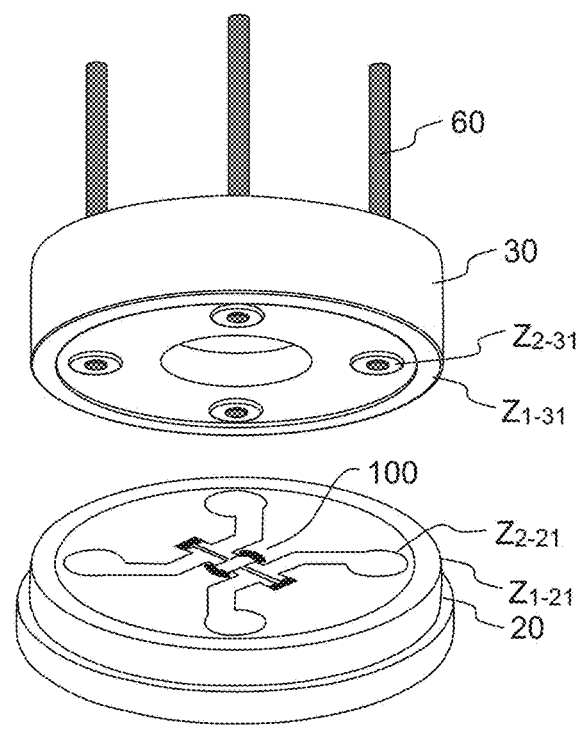
Figure 6D:
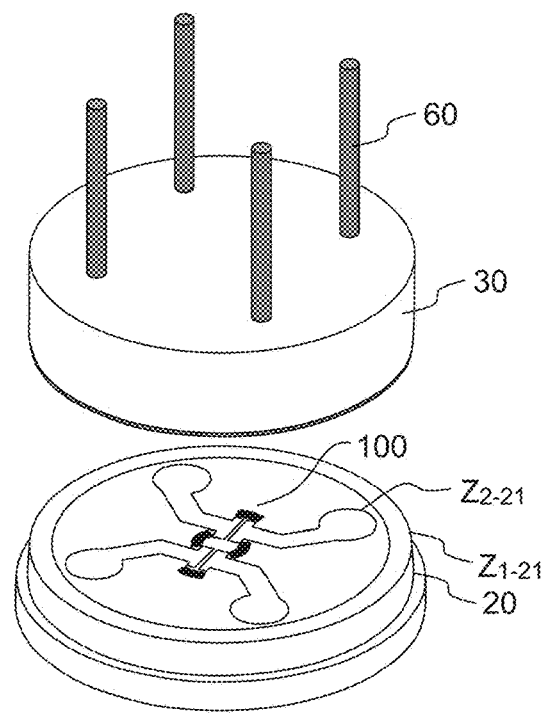
Figure 6E:
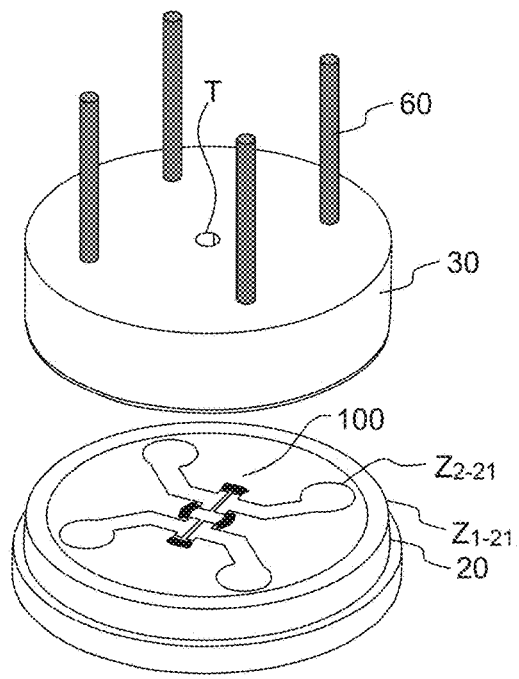
Figure 6F:
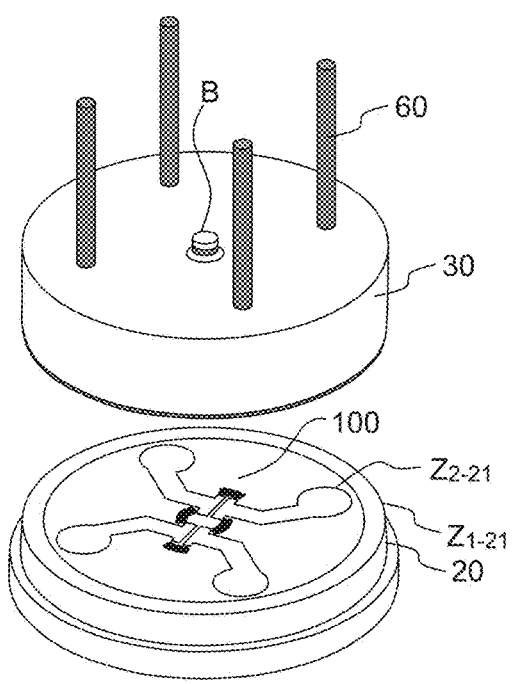

To produce the zones $Z_1$ and $Z_2$ simultaneously, it is advantageously possible to produce the pressure sensor by assembling the sensitive membrane 20 and the cap 30 comprising pins 60 introduced into the holes, in a single operation, the hermetic sealing and the contact taps between the gauges 100 and the pins 60 being obtained at the same time by refusion (eutectic sealing) of a stack of metallic layers 21+31 in which the metallic patterns are defined. FIGS. 6c and 6d depict the production of metallic patterns making it possible to define at the level of the sensitive element the zones $Z_{1-21}$ and $Z_{2-21}$ respectively dedicated to the sealing and to the contact pickups for the gauges 100 and at the level of the cap, the zones $Z_{1-31}$ and $Z_{2-31}$ respectively dedicated to the sealing and to the contact pickups for the pins 60. FIG. 6e represents a variant with a hole T making it possible to produce a so-called gage sensor, having atmospheric pressure as reference pressure. FIG. 6f represents a variant with the addition of a stopper B making it possible to seal the vacuum subsequently.

Preferably, the cover and the membrane are made of materials having the closest possible, very advantageously identical, expansion coefficients. In this case an insulating thin layer, typically of $SiO_2$ or $Al_2O_3$ is deposited first on the active faces of the metal, this not being represented in FIGS. 6a and 6b.

To carry out the assembling of the sensitive element and of the cap, it is possible to carry out a brazing operation. In order to ensure an optimum hermetic link, the method of the present invention can advantageously comprise a eutectic metallic sealing operation.

Figure 7:
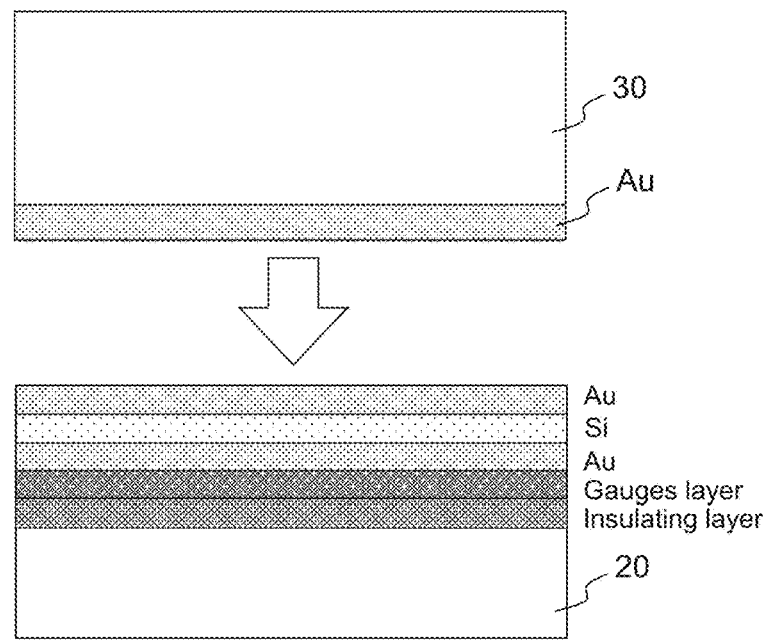
FIG. 7 represents an operation of assembling a cap and a sensitive element constituting a step of a method for manufacturing a sensor according to the invention.

More precisely, the sealing operation can, according to an advantageous embodiment, be performed with the stack of layers illustrated in FIG. 7 with thicknesses of metallic layers of the order of a micrometer (μm). The component of the cover 30 comprises a layer made of Au, the sensitive element comprises, stacked on the membrane 20, an insulating layer, a layer in which the gauges are produced, a layer of Au, a layer of Si and a layer of Au, the sealing being a eutectic sealing.

The metallic sealing zone can thus advantageously consist of a layer of eutectic such as Au/Si. Other elements can also be used to form eutectics such as Au/Sn, Al/Ge . . . .

The composition is chosen as a function of the best possible compromise between sealing temperature, leaktightness, bulkiness, solidity, reproducibility. From this point of view a preferred solution can be the composition Au/Si. Eutectic based sealing is obtained by placement in contact, and then thermal treatment at a temperature greater than the melting temperature of the alloy of layers of gold and silicon.

Thus a cap comprising a gold layer and a sensitive element covered with a stack: Au/Si/Au can be fixed between themselves with a sealing temperature of greater than 363° C.

Figure 8A:
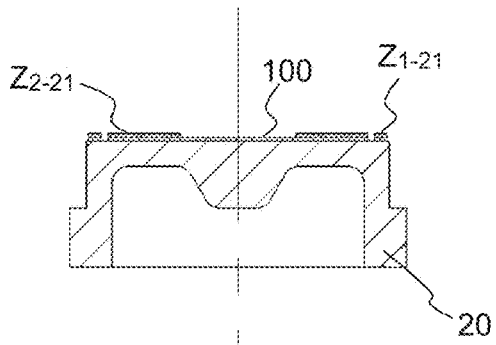
FIG. 8a represents a sectional view of the sensitive element in a second type of sensor of the invention comprising conducting elements offset with respect to the contact pickups for the strain gauges.
Figure 8B:
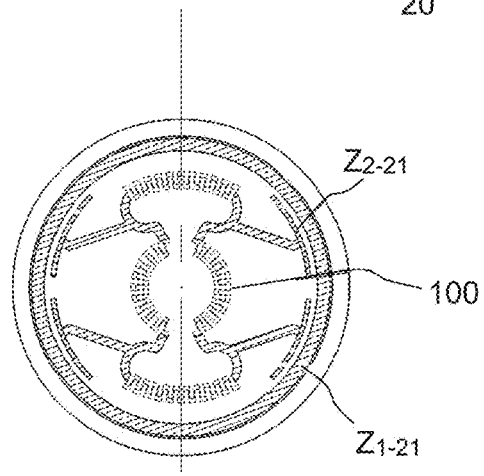
FIG. 8b represents a view from above of the sensitive element in the second type of sensor of the invention.

Second Type of Pressure According to the Invention:

According to this variant of the invention, particularly advantageously for miniaturization, as illustrated in FIGS. 8a, 8b, 9a, 9b and 10, the sensitive element part can be the same as in the variant described previously. A component 20 comprises a membrane part, comprising at the surface at least one strain gauge 100 (or indeed preferentially four gauges mounted as a Wheatstone bridge). The production of metallic patterns makes it possible to define at the level of the sensitive element the zones $Z_{1-21}$ and $Z_{2-21}$ respectively dedicated to the sealing and to the contact pickups for the gauges 100 as shown in FIGS. 8a and 8b.

Figure 9A:
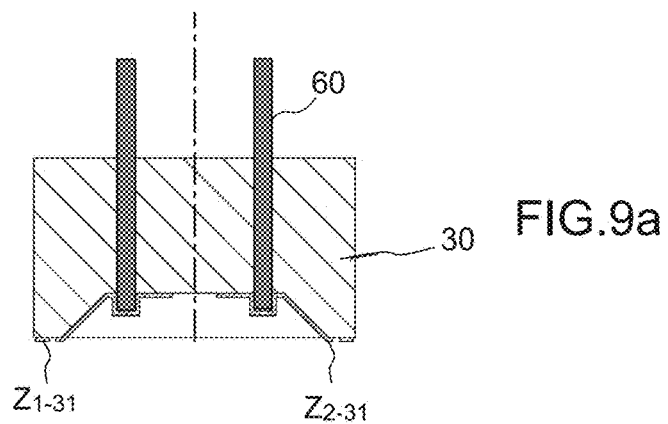
FIG. 9a represents a sectional view of the cap in the second type of sensor of the invention.
Figure 9B:
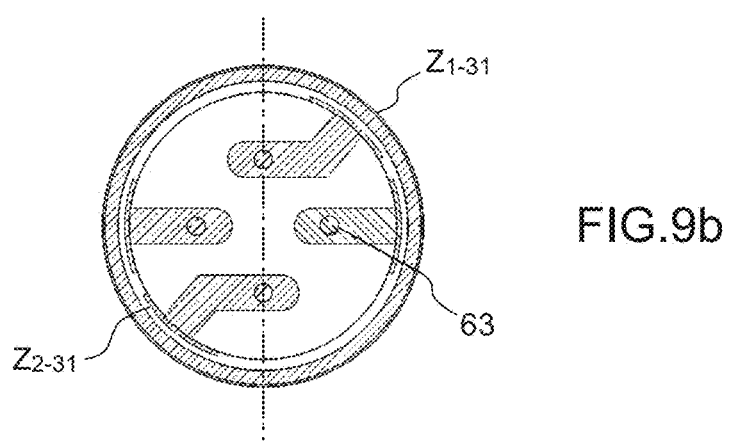
FIG. 9b represents a view from below of the incorporated cap in the second type of sensor of the invention.

According to this variant of the invention, the output pins 60 are located in a central, hollowed out part of the cover. FIGS. 9a and 9b thus illustrate the cover 30 equipped with contact pickup pins 60, and the zones $Z_{1-31}$ and $Z_{2-31}$ respectively dedicated to the sealing and to the contact pickups for the pins 60, positioned in emergent holes 63.

Figure 10:
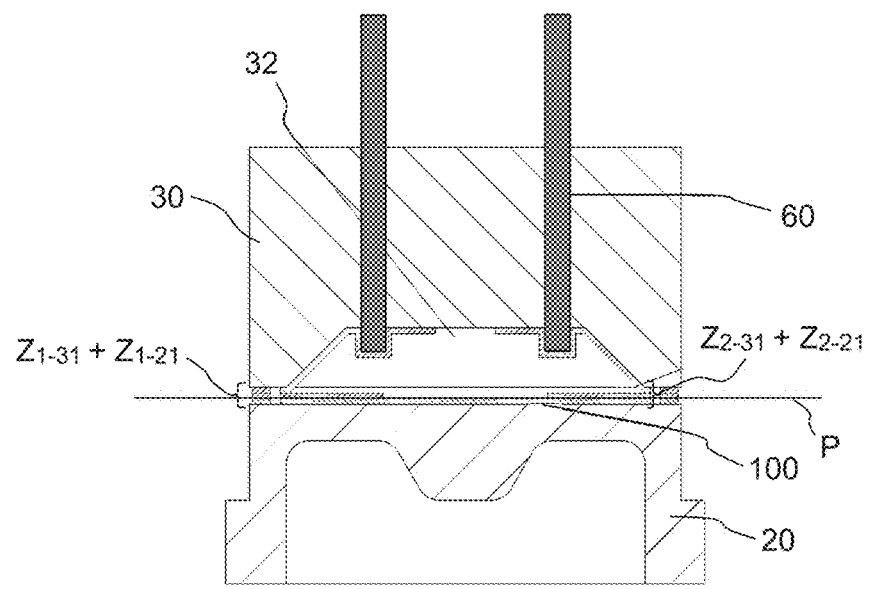
FIG. 10 represents a sectional view of the second type of pressure sensor of the invention.

The assembling operation can be identical to that developed in the previous variant. FIG. 10 illustrates the sensor and its cavity 32 after assembling of the parts 20 and 30. The placement in contact of the zones $Z_{1-21}$ and $Z_{1-31}$ arising from the layers respectively 21 and 31 makes it possible to define the zone $Z_1$ to ensure the fixing of the sensitive element and of the cap. The placement in contact of the zones $Z_{2-21}$ and $Z_{2-31}$ arising from the layers respectively 21 and 31 makes it possible to define the zone $Z_2$ and to ensure the pickup of contact of the gauges via the pins 60. This figure depicts the offsetting of the pins 60 and of the contact pickup zones $Z_{2-31}$ with respect to the metallic contact pickup zones $Z_{2-21}$. This figure also depicts that the hermetic sealing and the contact pickups for the gauges are ensured at the level of the plane P corresponding to the plane of the face of the sensitive element opposite the cap.

The benefit of this variant is that the width of the sealing bead, corresponding to the zone $Z_1$, can be reduced independently of the diameter of the output pins, which pins cannot be miniaturized to the extreme. By virtue of this solution it thus becomes possible to go a very long way in miniaturization.

Figure 11A:
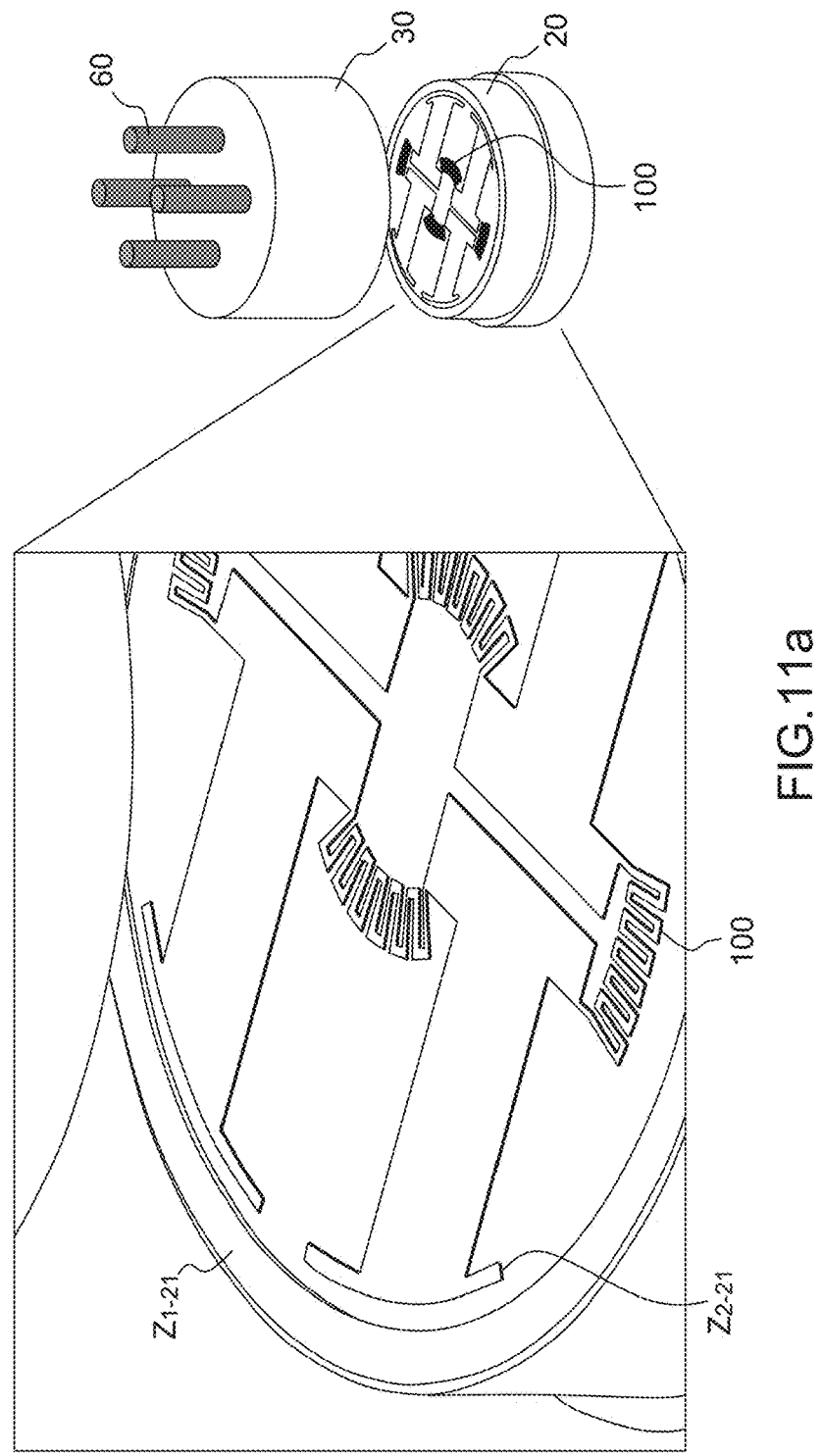
Figure 11C:
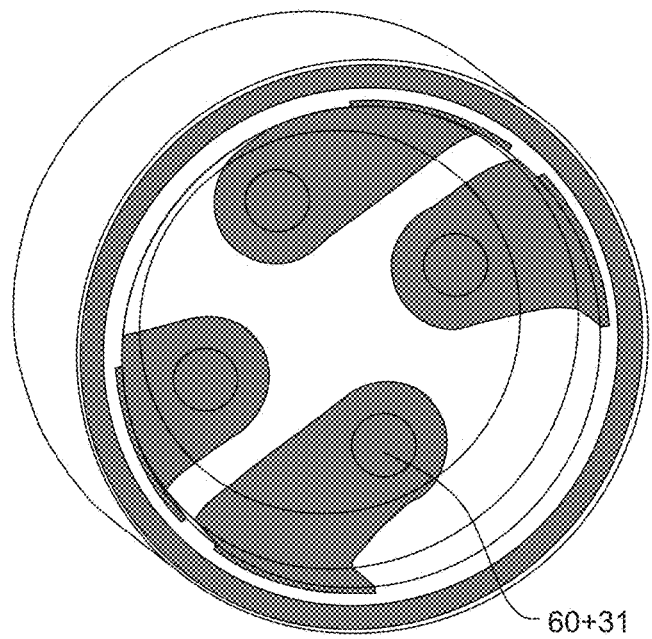
Figure 11D:
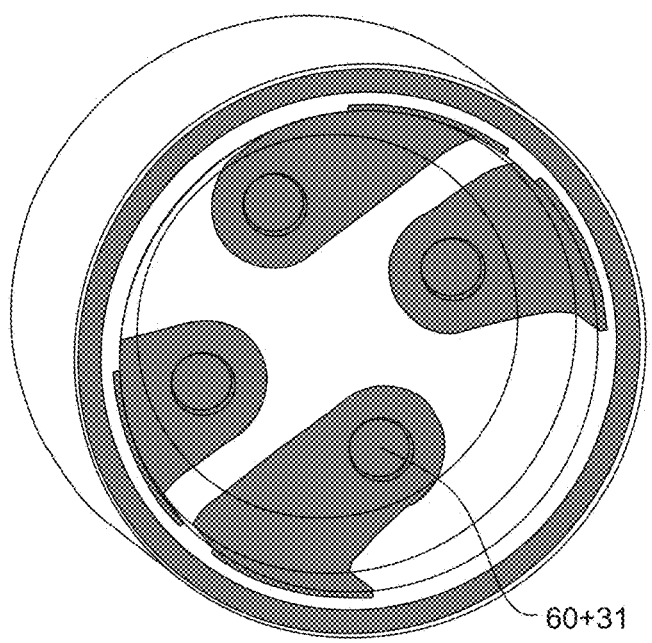

FIGS. 11a and 11b illustrate perspective views of this variant of the invention, depicting respectively on the one hand the zones $Z_{1-21}$ and $Z_{2-21}$ defining metallic patterns that may result from the etching of the metallic layer 21 produced on the surface of the sensitive element and on the other hand the pins 60, referenced 60+31, clad at their end with the metallization layer 31 and making it possible to ensure the definition of the zones $Z_{2-31}$. The end of the pins 60 can equally well emerge from the bottom of the cover cavity holes (FIG. 11b), as be aligned with the cavity bottom (FIG. 11c), or else be located inside the emergent holes of the cover (FIG. 11d), the layer 31 nonetheless infiltrating the emergent holes and also cladding their end so as to ensure pickup of contact.

Figure 12:
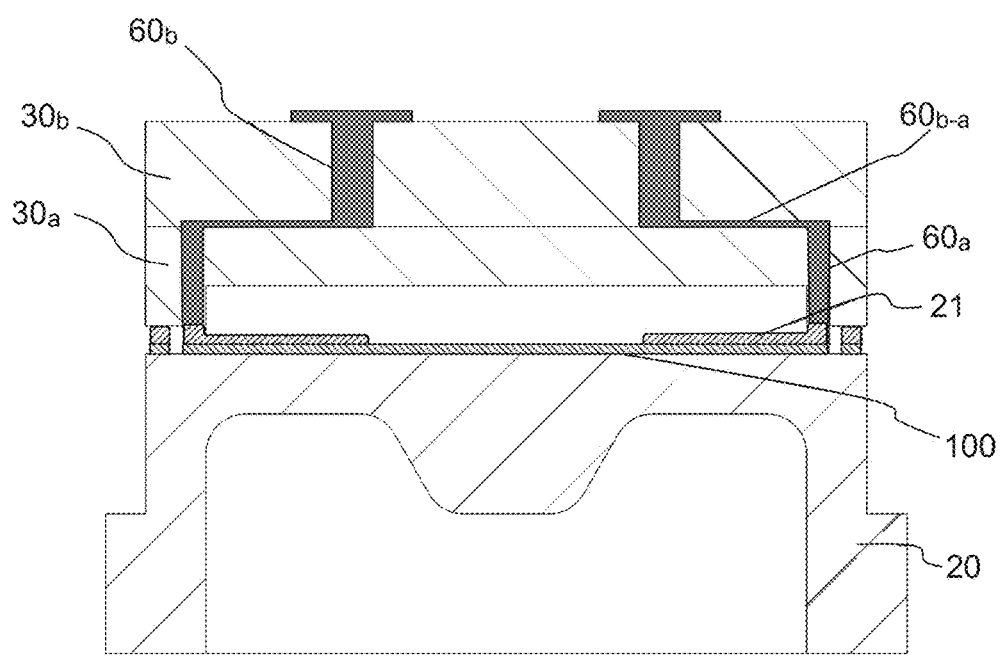
FIG. 12 represents a sectional view of a third type of sensor of the invention incorporating a cap produced by the LTCC technique.

Third Type of Pressure Sensor According to the Invention:

An alternative to the cover comprising a ceramic substrate can be to use a stack of ceramic layers. Accordingly it is possible to use LTCC (Low Temperature Co-fired Ceramics) techniques to produce the cap comprising incorporated conductors. FIG. 12 illustrates an exemplary cap comprising a stack of dielectric layers 30a, 30b on the surface of which are produced metallic patterns $60_{b-a}$ linked together by metallic vias 60a, 60b. The circuit is then produced from flexible sheets of ceramics (30a and 30b). These sheets are then cut, drilled with vias and the metallic patterns silk-screen-printed with conducting ink. The manufacture of the cap is then finalized by baking the stack in an oven.

In general, the sensor of the present invention is a compact and miniaturizable pressure sensor, which can be easily attached to client connection. To ensure this attachment function, the sensor comprises a connection.

Figure 13:
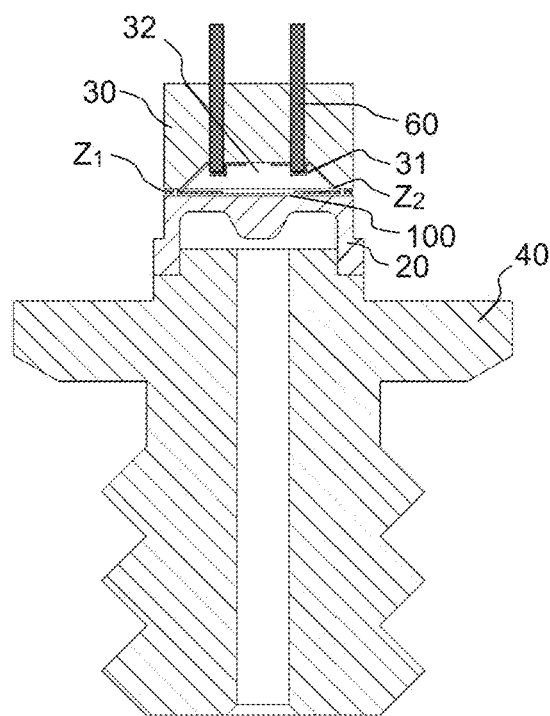
FIG. 13 represents a sectional view of a sensor according to the invention assembled with a connection.

First Exemplary Pressure Sensor According to the Invention Comprising a Connection Intended to Cooperate with a Client Connection:

According to this example, the metallic component 20 is tied to a connection 40 itself exhibiting a threaded part as represented in FIG. 13, to ensure leaktight fixing with a client connection.

Figure 14:
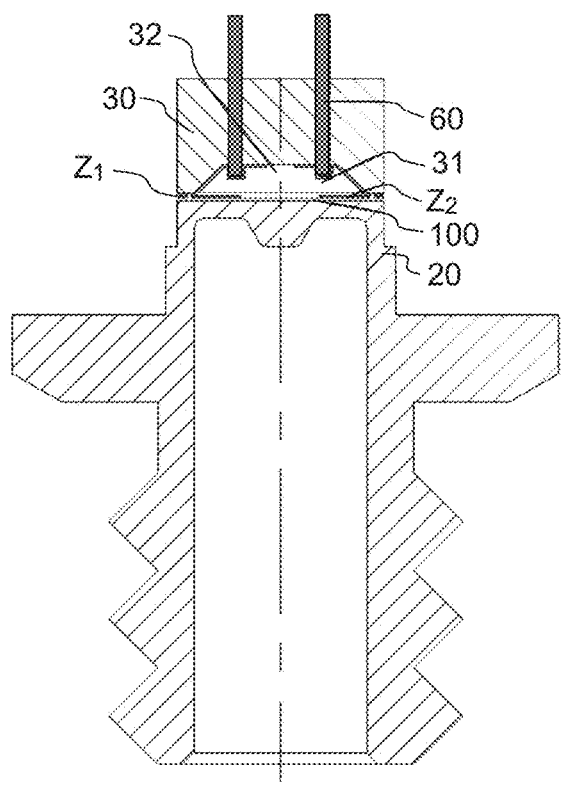
FIG. 14 represents a sectional view of a sensor according to the invention comprising a monolithic component incorporating the membrane and a connection.

Second Exemplary Pressure Sensor According to the Invention Comprising a Connection Intended to Cooperate with a Client Connection:

According to this example, the membrane 20 and the connection are produced in a monolithic metallic component, the connection part itself exhibiting a threaded part as represented in FIG. 14, to ensure leaktight fixing with a client connection.

Figure 15A:
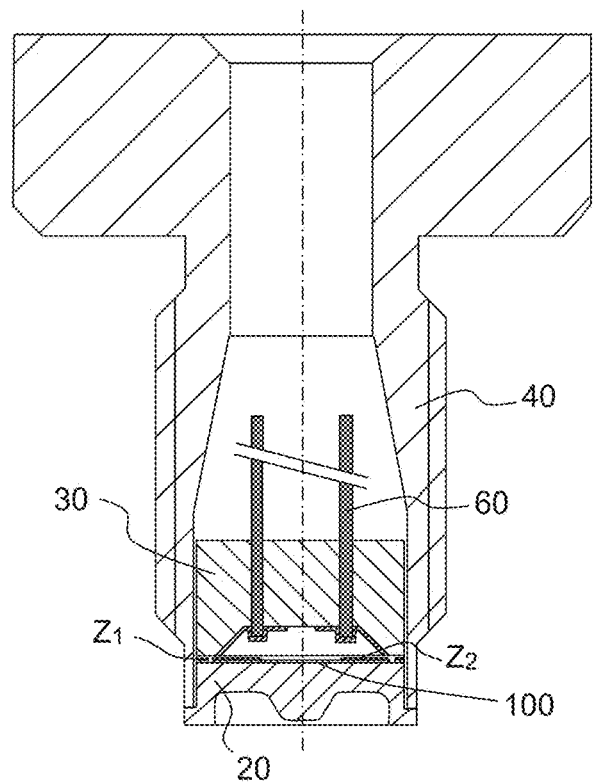
FIGS. 15a and 15b represent a sectional view and a perspective view of a sensor according to the invention assemblied with a connection.
Figure 15B:
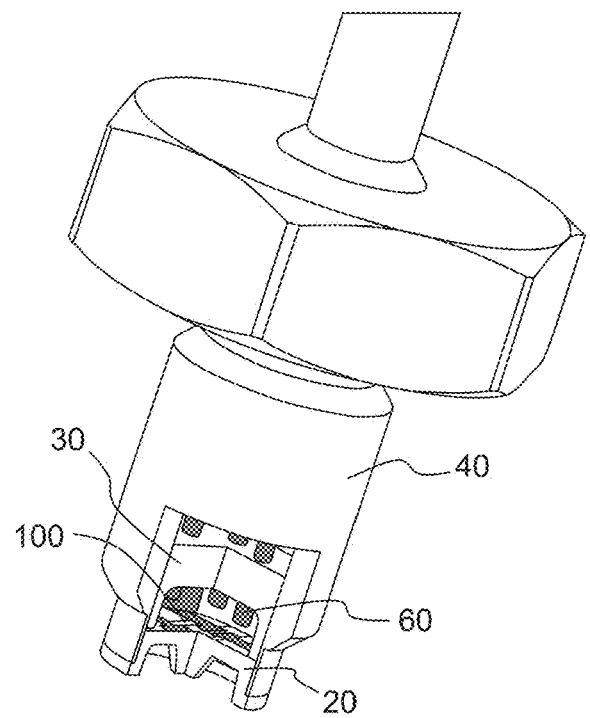

Third Exemplary Pressure Sensor According to the Invention Comprising a Connection Intended to Cooperate with a Client Connection:

The setup of a solution with the membrane flush with the fluid to be measured makes it possible to optimize the miniaturization while offering a response to the dynamic measurement requirements. According to this example, the metallic component 20 is assembled with a connection 40 itself exhibiting a threaded part as represented in FIGS. 15*a* and 15*b*, to ensure leaktight fixing with a client connection.

The invention claimed is:

1. A pressure sensor configured to measure a pressure of a fluid comprising:
   a metallic membrane having a first surface configured to be in contact with said fluid and a second surface on which are stacked an electrical insulator and at least one gauge configured to measure a deformation of said metallic membrane, the metallic membrane, the electrical insulator, and the at least one gauge forming a sensitive measuring element,
   a cap comprising:
      a cover comprising a cavity and holes; and
      conductors located in said holes,
   said sensitive measuring element including a face positioned opposite the cap and located in a plane P;
   wherein said pressure sensor further comprises:
   at least one metallic zone, located in a plane parallel to said plane P, for hermetic sealing of said cap on said sensitive measuring element; and
   continuous metallic tracks comprising parts configured to contact said conductors and parts configured to contact at least said gauge.

2. The pressure sensor configured to measure the pressure of a fluid according to claim 1, wherein the parts for picking up contact with said conductors are offset with respect to the parts for picking up contact with at least said gauge, ensuring an electrical link exhibiting a break in transmission axis.

3. The pressure sensor configured to measure the pressure of a fluid according to claim 1, wherein the cover is made of metal and comprises at least one dielectric layer.

4. The pressure sensor configured to measure the pressure of a fluid according to claim 1, wherein said cover is made of ceramic material.

5. The pressure sensor configured to measure the pressure of a fluid according to claim 4, wherein the conductors are vias.

6. The pressure sensor configured to measure the pressure of a fluid according to claim 4, wherein the cover comprises a stack of dielectric layers comprising on their surface metal patterns linked between layers by vias.

7. The pressure sensor configured to measure the pressure of a fluid according to claim 1, wherein said conductors are pins.

8. The pressure sensor configured to measure the pressure of a fluid according to claim 7, wherein said pins are fixed hermetically to said cover with glass elements.

9. The pressure sensor configured to measure the pressure of a fluid according to claim 7, wherein said pins are fixed hermetically to said cover with at least one metallic layer.

10. The pressure sensor configured to measure the pressure of a fluid according to claim 1, wherein the cap comprises at least one opening making it possible to reference the sensitive element to atmospheric pressure.

11. The pressure sensor configured to measure the pressure of a fluid according to claim 1, comprising a connection with which said sensitive element is assembled.

12. The pressure sensor configured to measure the pressure of a fluid according to claim 1, comprising a monolithic component comprising said sensitive element and a connection.

13. A method for manufacturing a pressure sensor according to claim 1, configured to measure the pressure of a fluid, comprising:
   the production of a sensitive element comprising a metallic membrane, an electrical insulator and at least one gauge for measuring the deformation of said membrane;
   the production on the surface of said sensitive element of a first metallic sealing zone and the production of metallic contact tracks of at least said gauge;
   the production on the surface of said cap of a second metallic sealing zone and the production of metallic tracks for picking up contact with the conductors;
   the assembling of said sensitive element and of said cap by brazing and/or welding in a plane parallel to that of the face of the sensitive element opposite the cap, so as to ensure pickup of contact and sealing.

14. The method for manufacturing a pressure sensor configured to measure the pressure of a fluid according to claim 13, wherein the metallic sealing zones or the metallic tracks are produced by etching of at least a layer made of metal or of at least a material capable of forming an eutectic with a metal or by silk-screen printing of a metal or of a material capable of forming a eutectic with a metal.

15. The method for manufacturing a sensor configured to measure the pressure of a fluid according to claim 13, comprising a sealing operation carried out in the presence of an exterior element as a material necessary for brazing or as an eutectic preform.

16. A pressure sensor configured to measure a pressure of a fluid manufactured according to the method of claim 13.

* * * * *